Patented Mar. 20, 1928.

1,662,999

UNITED STATES PATENT OFFICE.

SAMUEL CABOT, OF JAMAICA PLAIN, MASSACHUSETTS, ASSIGNOR TO SAMUEL CABOT, INC., OF BOSTON, MASSACHUSETTS, A CORPORATION OF MASSACHUSETTS.

METHOD OF COLLOIDALLY DISPERSING SOLIDS.

No Drawing. Application filed January 31, 1925, Serial No. 6,016. Renewed July 28, 1927.

My present invention involves the production of matter in a new state of colloidal dispersion by what is commercially at least a new process and the accomplishment of such dispersion in certain media in which such matter is not soluble or normally dispersible to a state of colloidal fineness.

The principles involved are capable of application to the production of a wide range of useful material. As illustrative of such application I will point out certain characteristic applications as well as a specific product from which the general utility of the invention will be apparent to those skilled in the art.

I therefore invite attention to the problem of dispersing pulverizable mineral matter, such as inorganic pigments, in organic liquids, such as hydrocarbons, animal or vegetable oils, etc. or mixtures of the same, in which they are not soluble and heretofore not dispersible in anything like colloidal fineness.

The ability to accomplish such a result would greatly facilitate many industrial and commercial operations and improve the resultant products. This may be readily accomplished by following the principles and practices of my invention.

To accomplish such colloidal dispersion I work the desired matter in the presence of a substance (normally colloidally dispersible in the selected dispersion medium) which will act as a protective colloid to the material to be so colloidally dispersed.

Types of these protective colloids will vary with the dispersion medium. For liquid hydrocarbons and animal and vegetable oils, acceptable colloids would be drying or semi-drying oils which have been polymerized by heat treatment or oxidized by blowing, or unvulcanized rubber; or for an alcohol dispersion medium fossil gum esters might be employed as colloids.

The number of these products which are natural organosols in different organic dispersion media is very great, and I do not intend to limit myself to any specific dispersion medium or group of media, or to liquids or to organic liquids, or to any colloid or group of colloids. Organosol colloids differ from hydrosols in that they are much less active in causing colloidal dispersion of mechanical suspensions, especially when dilute. In fact, when in this dilute or highly dispersed condition if the colloidal particles tend to attach themselves to the particles in mechanical suspension at all, they are apt to cause flocculation.

This tendency cannot readily be overcome by mechanical work by ordinary methods alone (a) in the dilute condition because of the weakness of the physical tendency of the organosol to assist in the disruption of the suspended particle and because of the hardness of the particle and the impossibility of direct attrition and disruption. Again, if the suspended particles and the organosol are brought together in a (b) concentrated form, that is, one in which there is a small proportion of the organic liquid, the viscosity will be very high.

In the case of (a) the high speed, so called "colloid" mills do not give satisfactory results or any appreciable dispersion for the reasons stated, and in the case of (b) the very high viscosity and also the high "yield value" make them inoperative.

As a result of the above conditions suspended mineral solids are almost unknown in colloidal dispersion as organosols and are only produced by very indirect processes or occur but very occasionally accidentally in nature, though they are very common as hydrosols.

My method is to make the solid particles disperse each other by mutual impact and peptize the colloid; and to make the colloid disrupt the solid particles and envelop them, preventing them from clotting together again.

This must usually be done in the presence of enough of a dispersion medium to make the mass slightly plastic, the colloid being generally a solid "gel" more or less hard. The three types of ingredient (solid, colloid and dispersion medium) are then kneaded together by any suitable machine such as a putty chaser.

The proportions of the three should be so balanced that only enough of the dispersion medium is present to make the mass kneadable. This is required so that the solid particles and the colloid will be working mutually on each other so that the former particles will be disintegrating each other and breaking up the gel structure of the latter, while the latter is disintegrating and pasticising the former. Lyophile dispersoid (polymerized drying oil) used as a protective colloid and as a disintegrator for the clumps of pigment must be of a sufficient cohesion so that the disruptive action of the kneading process will tend to break apart the pigment clumps rather than to pull apart the colloid. The best proportion is one in which only sufficient dispersion medium is used to bring the colloid from a hard brittle gel condition to a plastic adhesive and cohesive one, and adding to this mixture as much solid as can be readily worked in a putty chaser and to give maximum plasticity but only as much as to give continuous interfaces with the colloid. It will be found that after the mass has become kneaded a few minutes it will become more and more plastic. It must be emphasized that the amount of the dispersion medium used to soften the colloid must be kept as low as possible in the mixture, for, if it is in excess, as is universally the case in present grinding methods, there will be practically no colloidal dispersion of the solid.

This process is to be clearly differentiated from the usual practices of grinding pigments in more or less viscous drying oils or varnishes. These oils and varnishes often do contain small quantities of organic matter in colloidal suspension. However, the extended dispersion of this organic colloid and the looseness or lack of stiffness of the grinding paste and the total lack of sufficient cohesion and adhesion in the colloid as it is so widely dispersed in the dispersion medium preclude colloidal dispersion of any useful or even appreciable proportion of the mineral particles. Furthermore, such extended dispersion and the looseness of the grinding paste tend to cause flocculation and abnormally rapid settling and gelling. This last condition makes it most difficult to again break up and stir into suspension the portion that has settled.

The foregoing is believed to be a fair and inteligible statement of the operation of my invention, but, in view of the tendency of science to shift and reinterpret its own terms I will attempt to interpret and explain my invention in more general terms, particularly as to its physical effects. In this I do not wish to be held to theory or limited thereby. The changes effected are submicroscopic and as far as I know impossible of actual observation or physical measurement.

My conception of the effects of my method and the conditions of the material in operation I will now set forth as my own best interpretation thereof.

My plasticising step seems to involve two factors jointly effective but perhaps differentiable. The first I may describe as attritive as the solid particles, not being lubricated, resistantly contact with each other, and result in their mutual progressive subdivision. During this step each subdivided particle is isolated, so to speak, by being promptly filmed by the colloid so that its surface (its new surface of subdivision) is coated and it becomes a colloidally isolated particle.

But the colloid seems to have another or further function or action which seems to be of great importance, although difficult to describe accurately. This is a disruptive action of the adhesive and highly plastic colloid, due to its physical condition and high surface energy. The action may be crudely described as a tearing apart of the particles during the kneading, the highly sticky colloid seizing upon the surfaces of the particles and the twisting and tearing action of the kneading pulling them apart, the colloid then enveloping the new surfaces formed in the progressive reduction of the material to its desired colloidal state.

The ratio of solid to colloid may be varied somewhat. To get good results there must be enough colloid to envelop and be adsorbed by the surfaces of the ultimate colloidally dispersed solid. There must be enough colloid and solid to make a stiff plastic mass with the dispersion medium. Thus, if as is usually the case, we have a rather extended dispersion of colloid in liquid, the solid must be kneaded into this in sufficient amount ultimately to make a stiff plastic mass.

The solid has, under proper conditions the striking effect on the colloidal gel of tending to break down its gel structure, rendering it more plastic and less elastic, and making it capable of dispersing into the dispersion medium more readily. For instance, a stiff colloidal jelly which cannot be dispersed in a liquid dispersion medium by any usual method, may be plasticised by kneading with a powdered solid and readily dispersed together with the solid in liquid by suitable means. The gel has the property of plasticising a combination of solid and liquid which would otherwise remain a damp powder.

After the kneading process the plastic mass may be extended to any desired extent, either in the putty chaser or any suitable mixer, with any medium in which the colloid will disperse.

When extended the product will usually be found to contain a small amount of granular coarse particles and from 70% to 100% of fine colloidally dispersed particles of varying size, which are often so fine as to give a transparent effect and yet imparting their color to the whole, thus closely resembling organic dyes.

It is notable that if we go beyond rather narrow limits either towards (1) excess of solid, or, (2) excess of dispersion medium, the dispersion does not take place because in the first case there is not enough colloid to coat the new surfaces formed by the breaking down of the solid, or make the mass plastic or to render it kneadable, and in the second case, there will be such an excess of the liquid that the particles will slip by each other and not come into contact at all, and the colloid will be so widely dispersed that the chances that its particles will come into contact with and disrupt and coat the particles of solid will be destroyed. Also, the colloid being so widely dispersed in the dispersion medium will not have the necessary adhesiveness and cohesiveness to pull the clumps of solid apart as described above.

For any one reasonably familiar with this art, it is not difficult to ascertain approximately the right combination as the mixture must usually initially have the appearance of a damp solid, and after kneading, of a stiff coherent sticky plastic mass.

As an example of my method, I add by weight to one part of linseed oil jelly (containing about 30% turpentine) three parts of such a pigment as "Titanox" (a combination of titanium oxide and barium sulphate.) I knead the pigment and colloid plus liquid together and then add one part of raw linseed oil and sufficient turpentine to make a good workable paint, and sufficient drier to make it dry as required.

The resulting material will be found to differ from a paint made with the same ingredients but by the usual grinding processes in that: (1) the pigment stays permanently in suspension; (2) it is more liquid; (3) it has more tinting power; (4) it has more spreading power; (5) it spreads more evenly; (6) it adheres more strongly to the surface; (7) on porous surfaces the fixative does not sink in and leave the pigment, to the same degree; and (8) the tendency of the pigment to chalk is largely eliminated.

My process is not limited in its scope as it may be used in the preparation of all manner of paints, stains, varnishes, enamels, rubber goods, plastics and the like, whether they contain as their medium of dispersion hydrocarbons, animal or vegetable oils, alcohols, ethers, halogenated liquids, and innumerable others, or whether their fixatives are drying oils, fossil gum esters, rubber or the like.

What I therefore claim and desire to secure by Letters Patent is:—

1. The method of producing a colloidally dispersed material from solid matter consisting in producing a plastic colloid of such adhesiveness and cohesiveness that its resultant effective tenacity is superior to that of the inter-particle cohesion of the matter to be reduced, and in disintegrating said matter by masticating it with only sufficient of the colloid to coat the ultimate particles and render the whole plastic.

2. The method of colloidally disintegrating a solid material consisting in isolating the particles thereof by disruptive mastication in a viscous plastic having a cohesive and adhesive tenacity superior to the inter-particle cohesion of the material.

3. The method of colloidally disrupting a disintegratable solid consisting in isolating the particles thereof by disruptive mastication in a plastic colloidally soluble in a predetermined medium and having a cohesive and adhesive tenacity superior to the inter-particle cohesion of the material at the force exerted.

4. The method of colloidally disintegrating a solid material consisting in isolating the particles thereof by disruptive mastication in a viscous plastic exerting on said material an adhesion superior to the cohesion of the material particle while maintaining at a predetermined rate of working an internal tenacity effectively superior to said particle cohesion.

5. The method of producing a colloidally dispersed material consisting in colloidally disintegrating a solid material by isolating the particles thereof by disruptive mastication in a viscous plastic having a cohesive and adhesive tenacity superior to the inter-particle cohesion of the material and in colloidally dispersing the plasticized material in an extending medium in which said viscous plastic is colloidally dispersible.

6. The method of producing a colloidally dispersed material from solid matter consisting in producing a plastic colloid of such adhesiveness and cohesiveness that its resultant effective tenacity is superior to that of the inter-particle cohesion of the matter to be reduced, and in disintegrating said matter by masticating it with only sufficient of the colloid to coat the ultimate particles and render the whole plastic, and in dispersing the plastic so formed in an extending medium in which it is dispersible.

7. The method of producing a colloidal dispersion of solid matter in a medium in which it is otherwise undispersible, consisting in colloidally disrupting the solid matter and isolating particles by mastication in a plastic colloidally soluble in the dispersion medium and having a cohesive and adhesive tenacity superior to the inter-particle cohesion of the material at the force exerted in mastication, and in dispersing in said medium.

8. The method of producing the colloidal suspension of mineral pigments in non-solvent organic dispersion media which consists in subjecting the mineral in comminuted condition to disruptive action by kneading it in a drying oil which has been brought to a state of adhesive and cohesive tenacity superior to the cohesion of the pigment particles said oil being colloidally dispersible in the dispersion medium and in dispersing in said medium.

9. The method of producing the colloidal suspension of mineral pigments in non-solvent organic dispersion media which consists in subjecting the mineral in comminuted condition to disruptive action by kneading it in a drying oil polymerized to a state of adhesive and cohesive tenacity superior to the cohesion of the pigment particles said oil being colloidally dispersible in the dispersion medium and in dispersing in said medium.

10. The method of producing a colloidal dispersion of mineral pigments in hydrocarbon liquid in which they are otherwise undispersible, consisting in colloidally disrupting the pigments and isolating the particles by masticating in a drying oil colloidally soluble in the hydrocarbon liquid dispersion medium and having a cohesive and adhesive tenacity superior to the interparticle cohesion of the pigment at the force exerted in mastication and in-dispersing said masticated product in a hydrocarbon medium.

11. The method of producing a colloidal dispersion of pigments in hydrocarbon liquid in which they are otherwise undispersible, consisting in colloidally disrupting the pigments and isolating the particles by masticating in an oil whose internal resistance has been increased by the satisfying of its unsaturated linkages so as to be colloidally soluble in the hydrocarbon liquid dispersion medium and of a cohesive and adhesive tenacity superior to the interparticle cohesion of the pigment at the force exerted in mastication and in dispersing said masticated product in the hydrocarbon liquid.

In testimony whereof I affix my signature.

SAMUEL CABOT.